No. 682,438. Patented Sept. 10, 1901.
B. V. VELASCO.
HORSE DETACHER.
(Application filed June 6, 1901.)
(No Model.) 2 Sheets—Sheet 1.
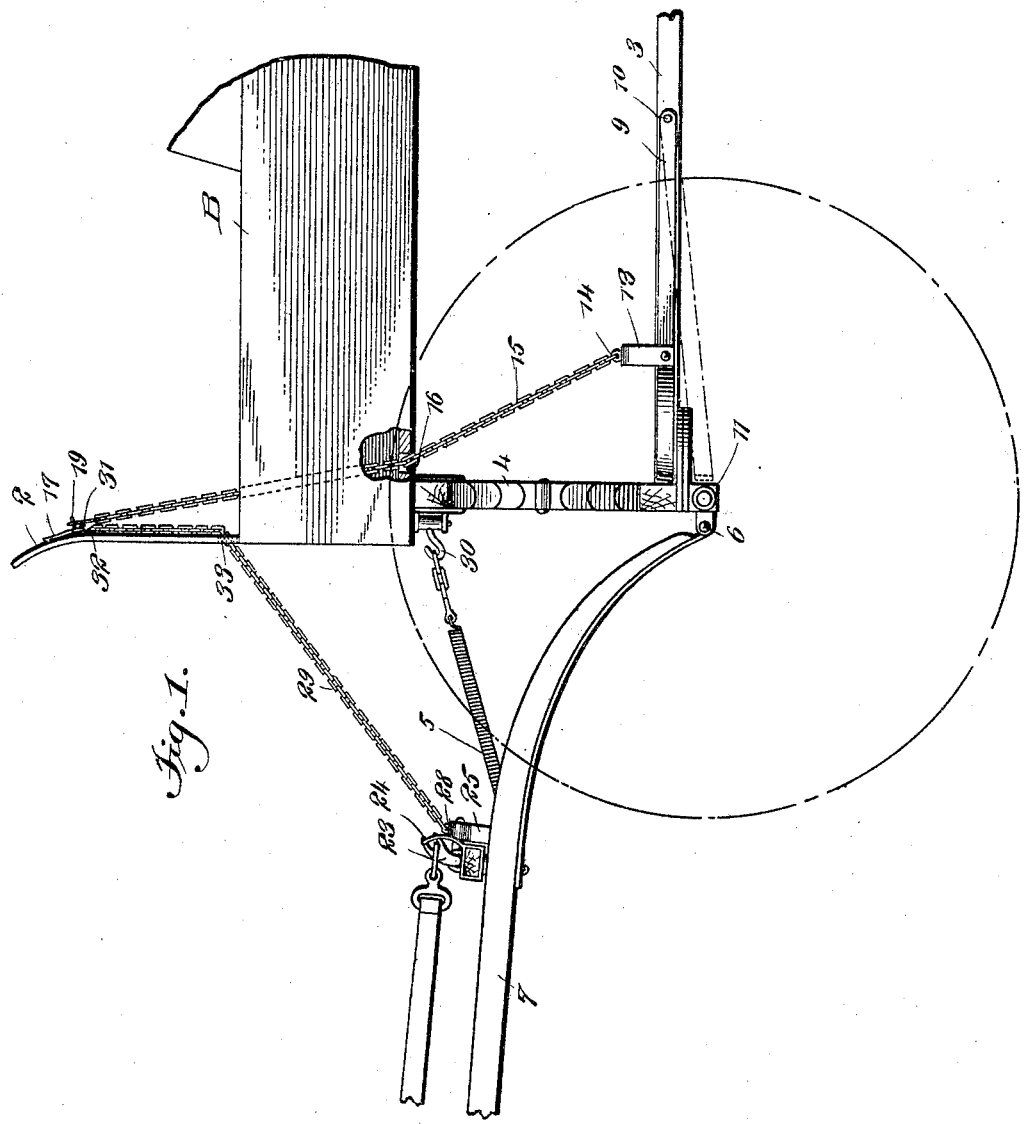
WITNESSES:
INVENTOR
Baldomero V. Velasco
BY 
ATTORNEYS No. 682,438. Patented Sept. 10, 1901.
B. V. VELASCO.
HORSE DETACHER.
(Application filed June 6, 1901.)
(No Model.) 2 Sheets—Sheet 2.
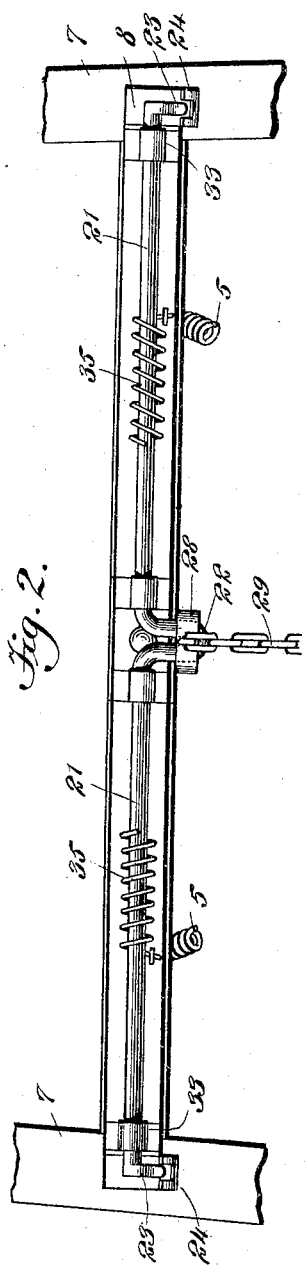
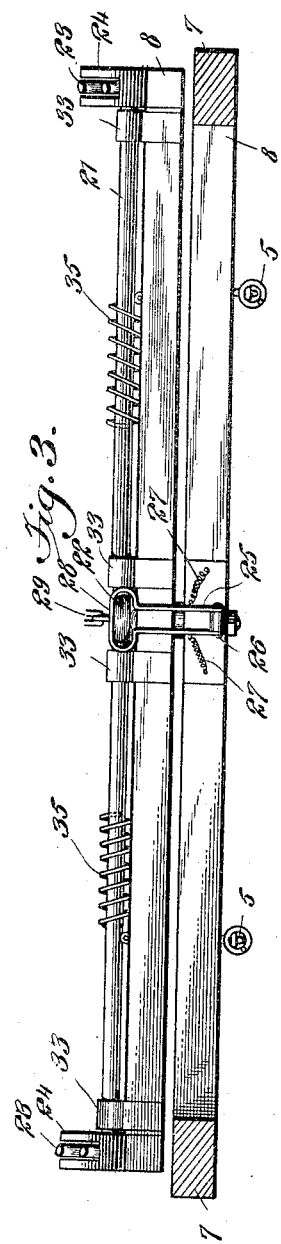
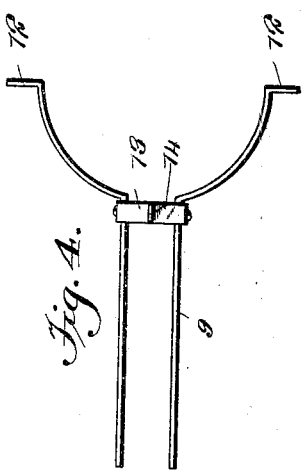
WITNESSES:
INVENTOR
Baldomero V. Velasco
BY
ATTORNEYS

UNITED STATES PATENT OFFICE.

BALDOMERO VALDES VELASCO, OF KEYWEST, FLORIDA.

HORSE-DETACHER.

SPECIFICATION forming part of Letters Patent No. 682,438, dated September 10, 1901.

Application filed June 6, 1901. Serial No. 63,382. (No model.)

*To all whom it may concern:*

Be it known that I, BALDOMERO VALDES VELASCO, a citizen of the United States, and a resident of Keywest, in the county of Monroe and State of Florida, have invented certain new and useful Improvements in Horse-Detachers, of which the following is a full, clear, and exact description.

My invention has for its object to provide an improvement in detaching means for permitting a ready separation between a horse and carriage when the horse starts to run away or begins to kick. It provides a means whereby the driver may easily permit of the traces being separated by the pull of the horse on the singletree or the doubletree, according as one or two horses are hitched to the carriage or wagon.

Further improvements and advantages will appear from the following description of my invention.

Reference is to be had to the accompanying drawings, forming a part of this specification, in which similar characters of reference indicate corresponding parts in all the views.

Figure 1 represents my improvement attached to a wagon or carriage. Figs. 2 and 3 represent, respectively, top and side views of a singletree and the detaching-bar; and Figs. 4 and 5 illustrate details of my invention, hereinafter more fully described.

B represents the box of the wagon or carriage, which is supported by means of springs 4 on the axle 11. Attached to the axle 11 by pins 6 are the thills 7, which are fastened together by means of a thill-bar 8. For the purpose of supporting the thills springs 5 are fastened to the thills 7, and at the other end the springs are fastened to the box of the wagon or carriage by means of the hooks 30. Connecting the forward and rear axles is a reach 3, and pivoted to the reach by a pin 10 is a Y-shaped controlling device 9. At the forward end of this controlling device are parts 12, bent at right angles and which are adapted to drop behind the axle and prevent the same from turning either to the right or the left. This causes the carriage or wagon to move always in a straight line and prevents it from turning to the right or the left, which may cause the wagon to overturn. Connected to this Y-shaped controlling means is a link 13, having an eye 14 fastened to its upper end, which eye is connected by means of a chain 15, passing up through an opening 16 in the bottom of the box B of the wagon or carriage and provided with an eye 31, adapted to be slipped over a hook 19, attached to the dashboard 2. When the chain is thus held by the hook 19, the Y-shaped controlling means is held clear of the axle and permits of the free movement of the axle.

The catching device 17 is formed by bending a rod into the shape shown in Fig. 5, forming eyes 18 and 20. The eye 18 is for the purpose of receiving a screw, whereby the catch 17 may be attached to the dashboard 2 of the wagon or carriage, while the eye 20 is for the purpose of receiving a hook 32, fastened to the end of the chain 29, passing through a hole 33 in the dashboard of the wagon or carriage down to the eye 28 of a U-shaped link 25. This link is pivoted to the thill-bar 8 by a pin 26 and is controlled by means of springs 27. The U-shaped link at its upper end has an enlarged head to permit it to readily pass over the U-shaped portion 22 of a detaching-bar 21, which is located on the top of the tree and fastened thereto by retaining-pieces 33.

On either side of the U-shaped portion of the detaching-bar 21 are located springs 35, which are fastened to the detaching-bar and also to the tree and are adapted to keep the detaching-bar in a definite position relatively to the tree. At either end of the detaching-bar are located V-shaped arms 23 at right angles to the detaching-bar 21. To the back of the tree are fastened spring-clips 24, which permit of free play of the V-shaped arms of the detaching-bar. These clips permit the eyes of the traces to be slipped over the V-shaped portions of the detaching means and also permit the ready unhitching of the horse.

When a horse starts to run away and gets beyond the control of the driver, it can be readily detached from the wagon or carriage by first slipping the eye 31 from the hook 19 and permitting the chain to pass down through the hole 16 in the body of the carriage or wagon B, thereby allowing the Y-shaped controlling means carried by the reach to drop behind the axle, which controls the direction of the motion of the carriage. The driver then pulls the chain 29, which operates the U-shaped link 25 and permits the detaching device 21 to be turned by the pull of the horses on the right-angled arms 23 and allow the eyes and braces to slip away from the detaching means. This permits a horse or horses to leave the wagon and also controls the direction of the wagon and prevents overturning of the same. The detaching means 21 and the U-shaped link 25 immediately return to their normal positions by operation of the springs 35 and 27.

Having thus fully described my invention, I claim as new and desire to secure by Letters Patent—

1. A horse-detacher, comprising a rocking shaft, provided with a crank and with harness-hooks, a movable link for detachably securing said crank, and a member controllable by hand for actuating said movable link and thereby releasing said crank.

2. A horse-detacher, comprising a rocking shaft, provided with a crank and with harness-hooks, a movable link for detachably securing said crank, stationary spring-clips normally closing said hooks, and a member controllable by hand for actuating said movable link and thereby releasing said crank.

3. The combination of a controlling means, a reach, a Y-shaped member pivoted on said reach, right-angular portions forming the forward ends of said member, an axle which is controlled in its position by said Y-shaped member, a link carried by said Y-shaped member, a chain, and a hook and eye for controlling the position of the Y-shaped member with respect to said axle.

4. A horse-detacher, comprising a rocking shaft provided with a crank and with harness-hooks, fixed spring-clips normally engaging said hooks for keeping the same closed, and a manually-operated link for detachably securing said crank and thereby holding said hooks in detachable engagement with said springs normally used for closing the same.

5. A horse-detacher, comprising a rocking shaft provided with a crank and also with V-shaped hooks for engaging the harness, spring-clips relatively stationary to said rocking shaft and normally straddling said V-shaped hooks so as to coact therewith, a pivoted link for detachably securing said crank, means for manually actuating said link in one direction, and springs for retracting the same.

In testimony whereof I have signed my name to this specification in the presence of two subscribing witnesses.

BALDOMERO VALDES VELASCO.

Witnesses:
JOHN W. SAWYER,
A. E. DOBARGANES.